United States Patent [19]
Van Huis

[11] 3,880,121
[45] Apr. 29, 1975

[54] ANIMAL FEEDING TROUGH APPARATUS WITH HINGED TROUGH

[75] Inventor: Robert L. Van Huis, Zeeland, Mich.

[73] Assignee: U.S. Industries, Inc., New York, N.Y.

[22] Filed: Oct. 10, 1973

[21] Appl. No.: 404,981

[52] U.S. Cl. .......................................... 119/52 AF
[51] Int. Cl. ............................................ A01k 5/02
[58] Field of Search .......... 119/52 AF, 56; 198/113, 198/115

[56] References Cited
UNITED STATES PATENTS

| | | | |
|---|---|---|---|
| 2,139,199 | 12/1938 | Morgan | 198/113 X |
| 2,694,483 | 11/1954 | Dion | 198/115 X |
| 3,124,104 | 3/1964 | Carpenter | 119/63 X |
| 3,581,712 | 6/1971 | Ferris | 119/56 |

*Primary Examiner*—Hugh R. Chamblee
*Attorney, Agent, or Firm*—Price, Heneveld, Huizenga & Cooper

[57] ABSTRACT

An animal feeding trough apparatus comprised of a plurality of sections of trough mounted above a floor and all coupled together to provide a trough feeder. At least two of the sections are connected together with a hinged trough connector permitting the trough to be hinged so as to provide a means for raising a portion of the trough a greater distance from the floor.

8 Claims, 7 Drawing Figures

ANIMAL FEEDING TROUGH APPARATUS WITH HINGED TROUGH

BACKGROUND OF THE INVENTION

This invention relates to an animal feeding trough system wherein a long length of trough, preferably on a continuous circuitous path, is provided for feeding animals. The trough includes a section which is hinged to provide a means for moving at least a portion of the trough a greater space above the floor so as to permit equipment and the like to move thereunder.

Animal trough feeding systems having elongated, continuous, circuitous troughs for carrying the feed have been used for many years as shown by U.S. Pat. Nos. 3,124,104 and 3,389,689. The system shown in U.S. Pat. No. 3,124,104 includes an open trough out of which poultry eat the feed which is circulated throughout the length of the trough. The system as shown in U.S. Pat. No. 3,389,689 is quite similar but in that case the poultry eat out of pans which are constantly filled by a trough from which the pans are suspended. In both of these, one problem experienced is that the trough is always in the way when the floor is to be cleaned and also when the birds are to be caught and caged for shipment. In both of these systems there is a means for lifting the entire system off the ground several feet but still it has been impossible to run equipment such as trucks, hi-los and the like underneath the trough because suspension systems for the same are generally not adequate for lifting the troughs sufficiently high to permit such equipment to be driven under the trough.

SUMMARY OF THE INVENTION

The present invention provides means for raising portions of a trough sufficiently high above the floor to permit equipment to pass thereunder without requiring an expensive means for lifting the entire system.

In accordance with this invention, at least one of the couplers for connecting the trough sections together is constructed of two sections which are hinged permitting the trough sections to be pivoted one with respect to the other thus raising that portion of the trough sufficiently above the ground to permit equipment to move thereunder.

the specific construction for accomplishing this end is described below in conjunction with the drawings.

DESCRIPTION OF THE PREFERRED EMBODIMENT

In reference to the drawings, it will be seen that the feeding system includes a hopper 1 for containing the feed and an elongated continuous trough 2 in communication with the hopper. Inside the trough 2 is a chain (not shown) which is driven by sprocket and gear mechanism 4. All of this apparatus as just described is conventional type of apparatus which has been used for many years for feeding poultry. The apparatus is suspended from the ceiling of the poultry house by the cables 5 which are preferably winched (not shown) so that the entire system can be lifted at one time. Winching apparatus of this type is disclosed in U.S. Pat. No. 3,124,04.

Figure 7:
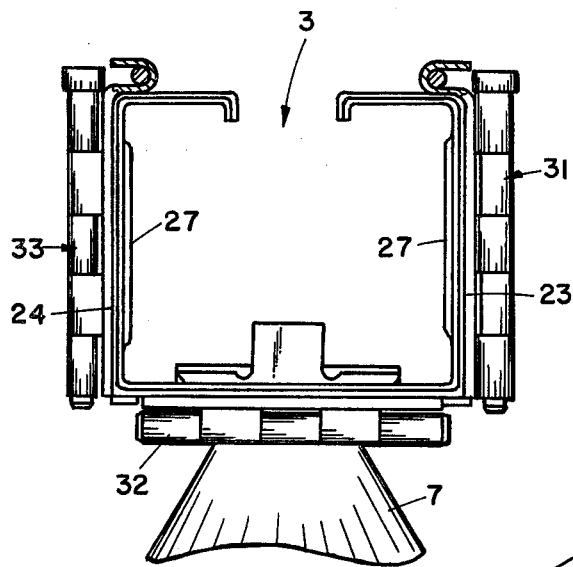
FIG. 7 is a partial, side elevational view of another embodiment of the invention wherein a pan is secured to and depends downwardly from the trough.
Figure 2:
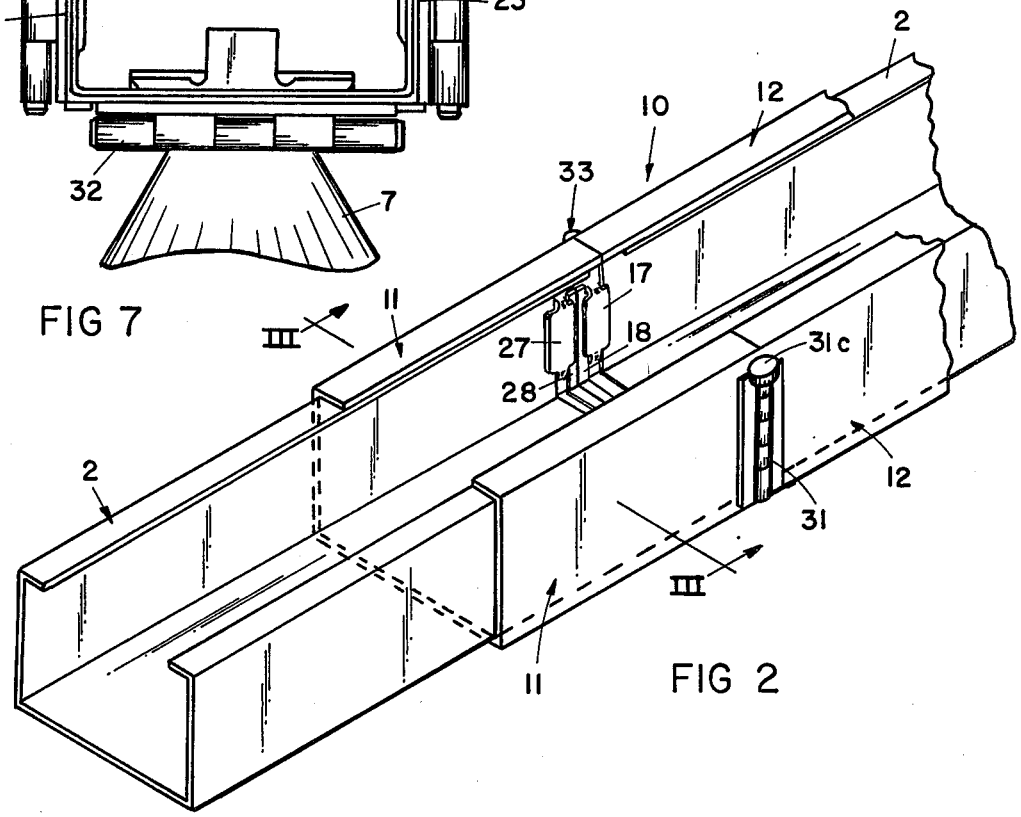
FIG. 2 is a perspective view of a section of the trough showing the hinged coupler of this invention.

The apparatus operates to feed the poultry by means of the chain which is driven by the sprocket and gear mechanism 4 carrying the feed out of the hopper 1 throughout the length of the trough. In this embodiment, the poultry eat directly out of the trough. In another embodiment, as shown in FIG. 7, there is only a slight opening in the top of the trough and secured to the bottom is a plurality of pans. Feed passes from the trough into and through the cone-shaped supports 7 to a pan, now shown. Structure of this type is specifically disclosed in U.S. Pat. No. 3,389,689, it being understood that except for the shape of the trough, the trough couplers, as will be described, are the same.

In accordance with this invention, I provide at least one and preferably two or more hinged trough couplers 10 which will now be described in conjunction with FIGS. 2–7.

Figure 3:
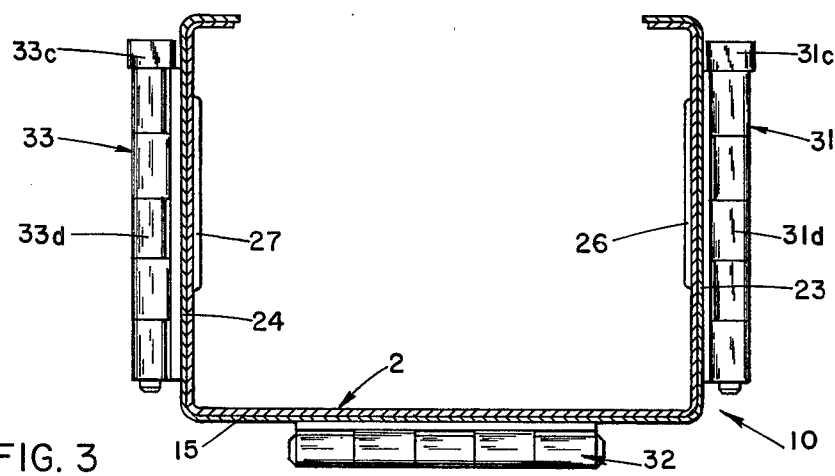
FIG. 3 is an elevational, cross section of the hinged section of the trough taken along the plane III—III of FIG. 2.
Figure 4:
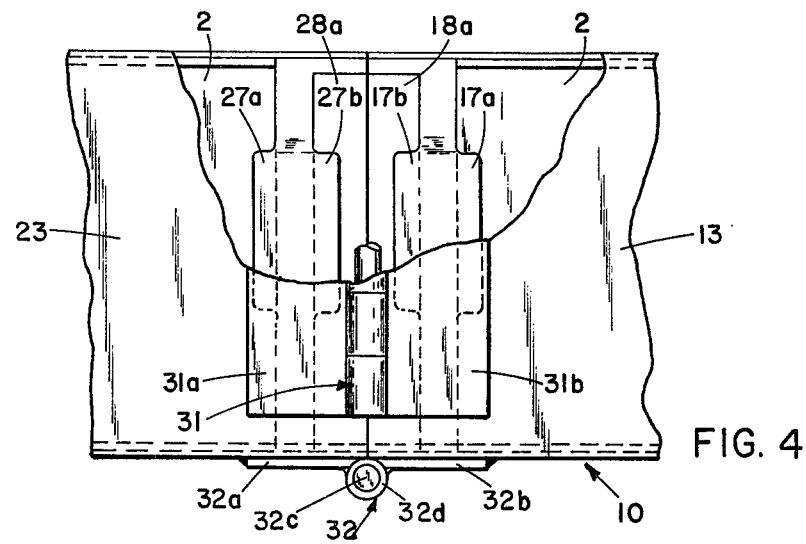
FIG. 4 is a side elevational view of FIG. 3 with a portion broken away to more clearly disclose the construction of the hinged trough coupler.
Figure 5:
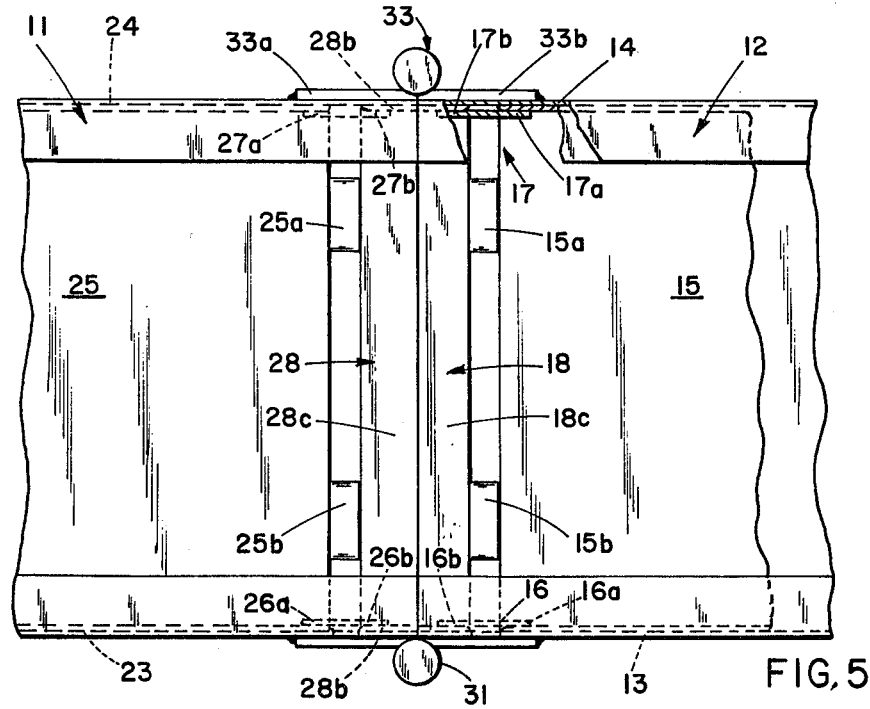
FIG. 5 is a plan view of the hinged section of the trough of this invention.

As shown in FIGS. 2–7, each hinged trough coupler 10 includes two sections, 11 and 12, of identical construction. These two sections are each U-shaped in cross section (FIG. 3). For example, as shown in FIG. 3, section 11 includes the sides 23 and 24 connected together by the bottom 25. The sides 23 and 24 each have lanced portions 26 and 27, these portions being lanced inwardly from the sides to provide the flanges 26a, 26b, 27a, and 27b. The bottom 25 of section 11 is lanced upwardly to provide the stops 25a and 26b, all for the purpose which will be described hereinafter. The section 12 also includes sides 13 and 14 connected together by the bottom 15 (FIG. 5). It also has the corresponding lanced portions 16 and 17 with the flanges 16a, 16b, and 17a and 17b, respectively. The bottom 15 is lanced to provide the stops 15a and 15b. The lanced portions in the sides 13 and 14 and in the bottom 15 serve the same purpose as the lanced portions 26, 27, 25a and 25b, all of which will be described hereinafter.

Each hinged trough coupler 10 also includes a pair of filler brackets 18 and 28 and the hinges 31, 32 and 33. The hinge 32 is attached to the bottoms 15 and 25 of the sections 12 and 11, respectively. Hinge 31 is attached to the sides 13 and 23 and hinge 33 is attached to the sides 14 and 24. These attachments of the hinges are by fillet welds along the sides and ends of the flat leaf portion of each hinge.

Now referring to the specific assembly of all the parts above described, it will be noted (FIG. 5) that the filler 18 is located at the very end of section 12 with its sides 18a and 18b located under the flanges 16b and 17b, respectively. The bottom 18c of filler 18 abuts against the stops 15a and 15b.

3

The filler bracket 28 is located at the very end of section 11 and its upstanding sides 28a and 28b are located under the flanges 26b and 27b, respectively. The bottom 28c of filler 28 abuts against the stops 25a and 25b. The two fillers 18 and 28 are spot welded to the bottom and sides of the sections 11 and 12, respectively, and provide the function of strengthening the ends of the sections and also filling the gaps in the lanced portions formed by the flanges 16b, 17b, 26b and 27b.

The hinge 32 is of conventional construction and includes two leaves 32a and 32b secured to the outside surfaces of the bottoms 15 and 25 of the sections 12 and 11, respectively. A riveted pin 32c extends through the interfitted members 32d of the hinge to permanently provide a pivotal connection between the sections 11 and 12.

Figure 1:
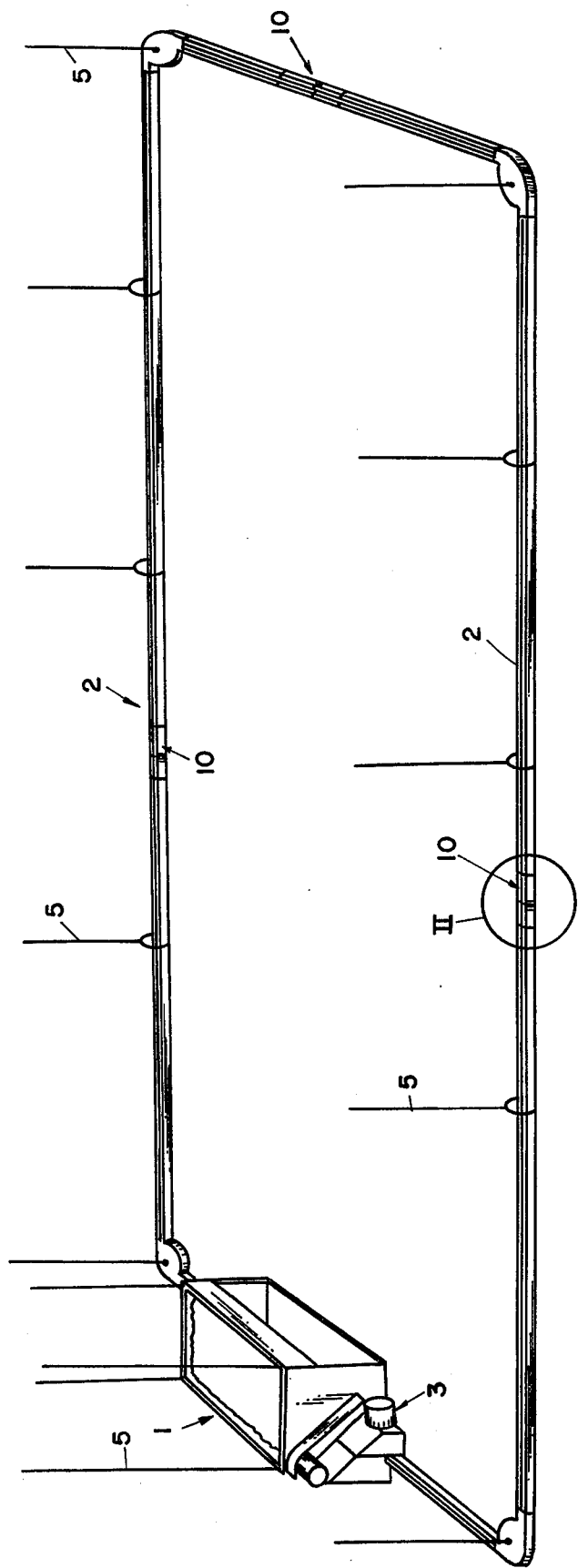
FIG. 1 is a perspective view of a conventional system previously described but incorporating this invention.
Figure 6:
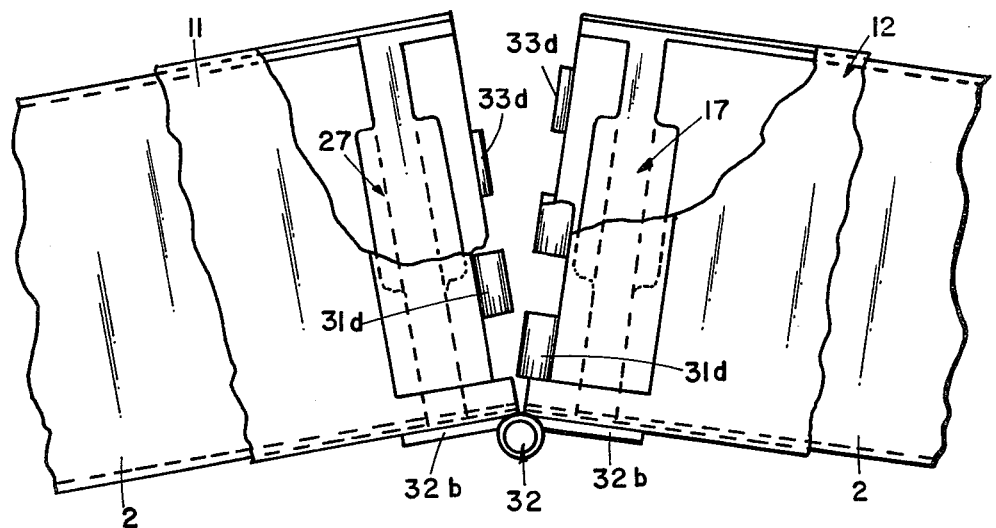
FIG. 6 is a partial, side elevational view of the hinged trough section in the pivoted or broken position.

The hinge 31 is of similar construction to that of hinge 32. It includes the flat leaves 31a and 31b, each of which are secured to the sides 23 and 13, respectively. Hinge 33 is of similar construction to that of hinges 31 and 32 and it includes the flat leaves 32a and 32b welded to the sides 24 and 14, respectively. Both of the hinges 31 and 33 have a removable pin 31c and 33c which extend through the interfitting portions 31d and 33d, respectively. Thus, the pins 31c and 33c lock the two sections together to prevent pivotal movement therebetween. However, if the trough sections are to be pivoted with respect to one another, as shown in FIG. 6, the pins 31c and 33c are removed, permitting the pivotal movement about the riveted pin 32c of the hinge 32.

Having described the hinged coupler, it should be obvious that the sections of the trough can be easily connected thereto by sliding them inside the sections 11 and 12 until the sides are engaged under the flanges 16a, 17a, 26a and 27a. In this position the very ends of the sections abut against the stops 15a and 15b and 25a and 26b. The trough sections are held in that position by the close fit or if desired by screws or by welding the ends of the troughs to the hinged coupler members 11 and 12.

OPERATION

Once the entire trough system is assembled with the hinged couplers 10 secured in at least one or more places along the circuitous path of the trough, preferably the entire system is raised by winches to a height of three or four feet. Then the pins 31c and 33c of the hinged couplers are removed and those portions of the trough immediately adjacent thereto are raised to a greater height, for example, 6 or 7 feet, by the trough being pivoted about the hinge 32. This permits the trough to be raised at selected portions thereof at a sufficient height wherein the operators can easily walk and trucks, hi-los or other equipment can be driven underneath the trough for cleaning of the floor inside the circuitous path of the trough. This invention also has great utility during a bird catching operation since it permits the ingres and egress of persons and equipment into the inside area of the circuitous trough.

Having described my invention, it should be understood that although I have described a preferred embodiment, other embodiments thereof within the scope of the invention are possible without departing from the spirit of the invention. For example, the entire trough system need not be suspended from the ceiling but could be mounted on leg supports, in which event,

4 pivoting of one section of the trough with respect to an immediate adjacent section could provide an opening for passage of persons and equipment from one side of the trough to the other without completely dismantling the trough system. Therefore, this invention should be limited only to the extent as indicated in the language of the following claims.

The embodiments of the invention in which an exclusive privilege or property is claimed are defined as follows:

1. In an animal feeding apparatus having an elongated continuous and circuitous trough for containing feed, feed supply means for supplying feed to said trough, the improvement comprising: said trough having at least two separate sections throughout its length; and means for pivotally connecting said sections to each other thereby permitting said sections to be arranged at an angle to each other to form an inverted "V" under which equipment can be moved; said means comprising a first part telescopically connected to said one trough section and a second part telescopically connected to the other of said trough sections, said parts each having at one end thereof a cross section corresponding to the cross section of the said section of said trough to which it is to be connected and at the other end having a cross section corresponding to the cross section of the other end of the other part; said parts each having an opening at the tops thereof; means for pivotally connecting said parts together for pivotal movement downwardly away from openings; and means for releasably locking such parts together when in aligned, mated position.

2. The apparatus of claim 1 in which the trough has two sides connected together by a bottom, said means for pivotally connecting said sections to each other being located at said bottom.

3. The apparatus of claim 1 in which the trough has two sides connected together by a bottom, said means for pivotally connecting said sections to each other being located at said bottom; and means on said sides for selectively locking said sections together to prevent pivotal movement.

4. The apparatus of claim 3 in which each of the means for pivotally connecting said trough sections together and means for locking said sections together comprise interfitting members connected together with a pin means, the pin means for said locking means being selectively insertable and removable to permit locking and unlocking of said locking means.

5. The apparatus of claim 1 in which the means for pivotally connecting said sections together comprise a coupler having two pivotally connected sections, one secured to one section of a trough and the other secured to another section of a trough.

6. A coupler for connecting two sections of a trough together, comprising two parts, a first part telescopically connected to said one trough section and a second part telescopically connected to the other of said trough sections, said parts each having at one end thereof a cross section corresponding to the cross section of the said section of said trough to which it is to be connected and at the other end having a cross section corresponding to the cross section of the other end of the other part; said parts each having an opening at the tops thereof; means for pivotally connecting said parts together for pivotal movement downwardly away from openings; and means for releasably locking such parts together when in aligned, mated position.

7. The coupler of claim 6 in which the sections are U-shaped with two sides connected together by a bottom, said means for pivotally connecting said sections to each other being located at said bottom.

8. The coupler of claim 6 in which the means for locking said sections together includes means on at least one side of each of said sections, said means including interfitting members and a selectively removable pin for connecting said members together.

* * * * *